United States Patent [19]

de Kok

[11] 4,321,228

[45] Mar. 23, 1982

[54] METHOD OF AND APPARATUS FOR MANUFACTURING A PLASTIC PIPE COMPRISING LONGITUDINALLY EXTENDING HOLLOW CHANNELS IN ITS WALL

[75] Inventor: Johan de Kok, Hardenberg, Netherlands

[73] Assignee: Wavin B.V., Em Zwolle, Netherlands

[21] Appl. No.: 133,849

[22] Filed: Mar. 25, 1980

[30] Foreign Application Priority Data

Mar. 27, 1979 [NL] Netherlands .................... 7902394

[51] Int. Cl.³ ............................................. B29D 23/04
[52] U.S. Cl. ............................. 264/209.8; 264/177 R; 425/197; 425/199; 425/380; 425/467
[58] Field of Search ............... 264/177 R, 563–569, 264/209.1, 209.3, 209.4, 209.8; 425/380, 467, 197, 199

[56] References Cited

U.S. PATENT DOCUMENTS

| | | | |
|---|---|---|---|
| 2,422,994 | 6/1947 | Taylor | 425/467 |
| 3,274,315 | 9/1966 | Kawamura | 264/177 R |
| 3,372,920 | 3/1968 | Corbett et al. | 264/173 |
| 3,562,879 | 2/1971 | Cremer et al. | 425/380 |
| 3,778,217 | 12/1973 | Bustamante et al. | 425/467 |
| 3,792,951 | 2/1974 | Meyers | 425/467 |
| 3,812,230 | 5/1974 | Takahashi | 264/177 R |
| 4,113,411 | 9/1978 | Terragni | 425/467 |

FOREIGN PATENT DOCUMENTS

| | | | |
|---|---|---|---|
| 1217592 | 5/1966 | Fed. Rep. of Germany . | |
| 1245582 | 7/1967 | Fed. Rep. of Germany . | |
| 1940195 | 3/1971 | Fed. Rep. of Germany . | |
| 2600859 | 7/1976 | Fed. Rep. of Germany | 264/209.1 |
| 7702872 | 9/1977 | Netherlands . | |
| 221215 | 11/1925 | United Kingdom . | |
| 432579 | 7/1935 | United Kingdom . | |
| 436864 | 10/1935 | United Kingdom . | |
| 756045 | 8/1956 | United Kingdom . | |
| 759161 | 10/1956 | United Kingdom . | |
| 994567 | 6/1965 | United Kingdom . | |
| 1150411 | 4/1969 | United Kingdom . | |
| 1408039 | 10/1975 | United Kingdom . | |

*Primary Examiner*—Jeffery R. Thurlow
*Attorney, Agent, or Firm*—Wigman & Cohen

[57] ABSTRACT

Method and extruder for manufacturing plastic pipes provided with longitudinal channels in its wall. Before the extrusion nozzle of the extruder, the stream of plastics to be extruded for forming the pipe is subdivided into two concentric annular streams flowing through two annular division channels formed by means of a dividing member being retained by only a breaker in the outer division channel, the other division channel forming a free passage between the channel inlet and the outlet.

8 Claims, 3 Drawing Figures

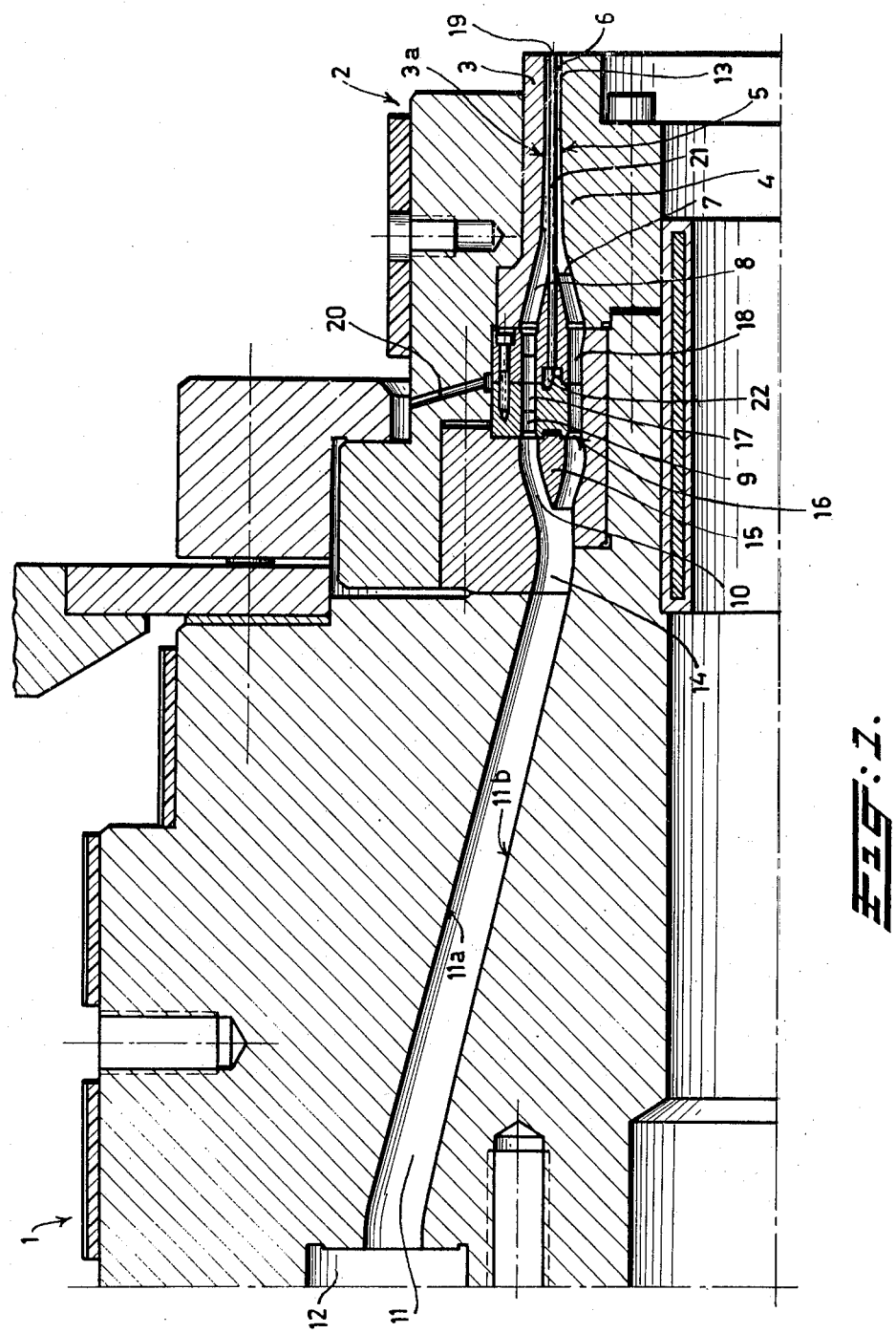

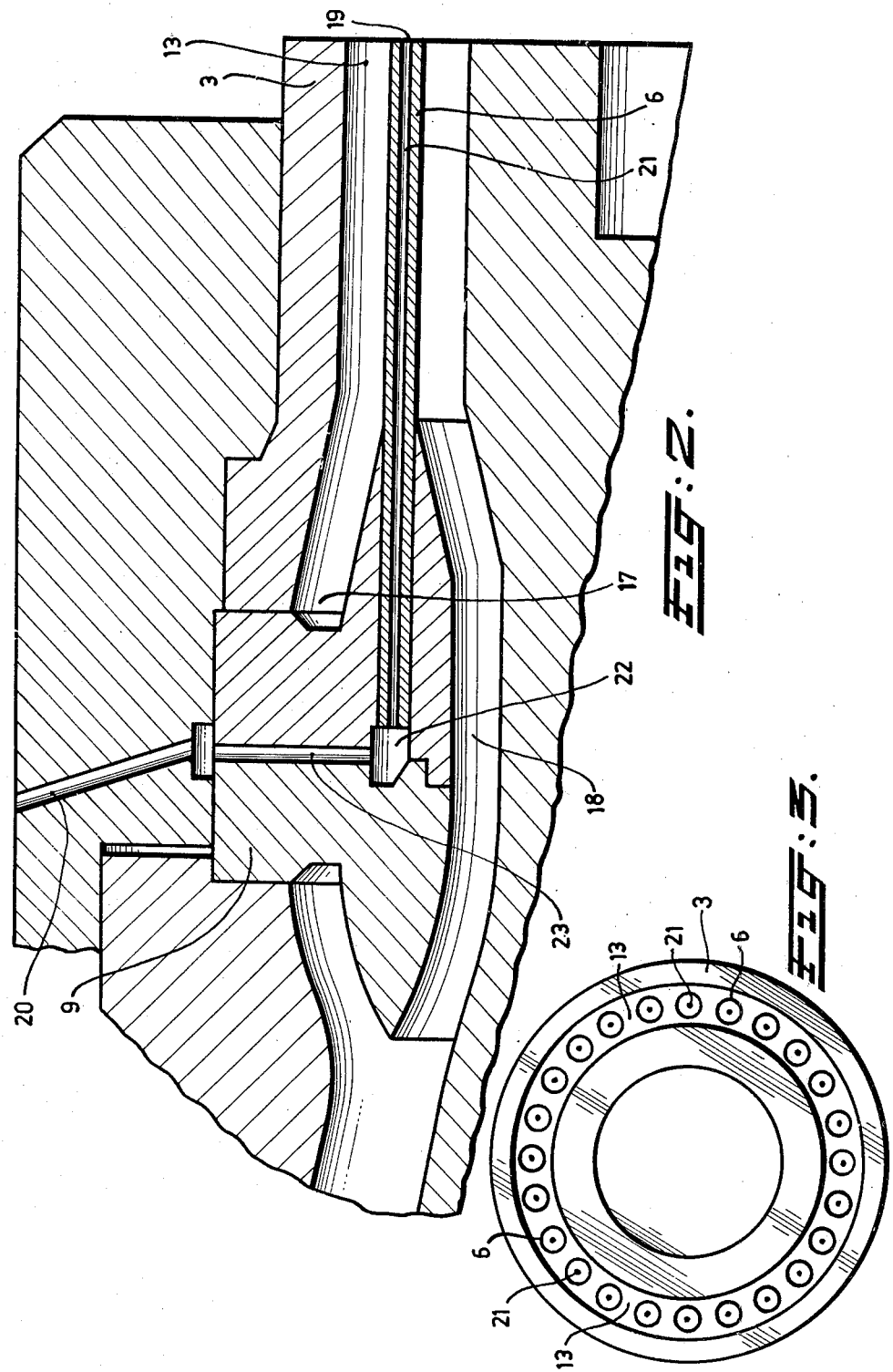

METHOD OF AND APPARATUS FOR MANUFACTURING A PLASTIC PIPE COMPRISING LONGITUDINALLY EXTENDING HOLLOW CHANNELS IN ITS WALL

BACKGROUND OF THE INVENTION

1. Field of the Invention

The present invention relates to a method of manufacturing a plastic pipe, the wall of which comprises longitudinally extending hollow channels, by extruding a thermoplastic through an annular extrusion zone provided with longitudinal closed zones, which form the hollow channels whereby, prior to approaching said longitudinal closed zones, the stream of thermoplastic is subdivided into two concentric annular streams, the stream of thermoplastic being subdivided at at least one location into ring segment partial streams.

2. Description of the Prior Art

In the prior art a method for manufacturing a plastic pipe, the wall of which comprises longitudinally extending hollow channels, has been used. In said prior art method the stream of thermoplastic is, prior to approaching the longitudinal closed zones, subdivided into two concentric annular streams, whereby each of said streams of thermoplastic is in turn subdivided into a ring segment partial stream.

This prior art method is inconvenient as problems will occur when plastic pipes of the aforementioned type, having a very small diameter, have to be produced. The construction of the apparatus concerned will also involve many problems, as a suspension of the device which serves for the subdivision of the stream of plastic into two concentric annular streams is rather difficult and complicated.

SUMMARY OF THE INVENTION

In view of the foregoing factors and conditions of the prior art it is a primary object of the present invention to provide a method of the abovementioned type which does not have said drawbacks and whereby also plastic pipes, having a very small diameter, and a wall comprising longitudinally extending hollow channels, are produced without any problems occurring as to the constructive composition of the apparatus for performing the relative method.

This is attained in accordance with the present invention in that only one of the concentric annular streams is subdivided into annular segment partial streams.

By only subdividing one concentric annular stream into annular segment partial streams, contrary to the prior art method in which both annular streams are subdivided into annular segment partial streams, the advantage is obtained that the undivided concentric annular stream easily adjoins the other annular stream, being subdivided into annular segment partial streams, which will lead to optimum properties of the plastic pipe so obtained.

Very advantageously, only the outermost of the concentric annular streams is subdivided into annular segment partial streams.

Owing to the latter, optimum properties of strength of the produced plastic pipe are obtained.

The invention also relates to apparatus for manufacturing a plastic pipe, the wall of which comprising longitudinally extending channels, said apparatus comprising an extruder provided with an extrusion die, a plurality of equidistantly circumferentially divided channel-forming pins, said pins being retained in an annular body, disposed in a cylindrical channel, thereby dividing said channel into two concentric annular division channels, and at least one breaker, while at least one of the concentric division channels forms a free passage between the inlet and the outlet of the annular division channels.

The features of the present invention which are believed to be novel are set forth with particularity in the appended claims.

Other features and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 1 is a longitudinal cross-section of the apparatus according to the present invention;

FIG. 2 is a partial cross-section of an apparatus in accordance with the present invention, which shows the channels through the pins in an apparatus according to the present invention;

FIG. 3 is a view of an extrusion nozzle of an extruder according to FIG. 1.

DESCRIPTION OF THE PREFERRED EMBODIMENTS

Initially referring to FIG. 1 a partial view is shown of an extruder 1 for manufacturing a plastic pipe the wall of which comprises longitudinally extending hollow channels. Said extruder 1 comprises an extrusion nozzle 2, which nozzle is composed of a housing 3 and a core 4. The annular outer wall 5 of the core 4 and the annular inner wall 3a of the housing 3, bound an annular extrusion zone 13. In this annular extrusion zone 13 channel-forming pins 6, being equidistantly circumferentially divided, are disposed, which pins are retained by an annular division body 15. Said annular body 15 is accomodated in a cylindrical channel 16, thus causing said cylindrical channel 16 to be subdivided into two concentric annular division channels 17 and 18. The pins mostly have a rounded shape, while their cross section is preferably round or elliptical.

A plastic stream flowing through the extruder 1, is, after having passed the concentric circular division channels 17 and 18, recombined to one stream in the space 13, through the transitions 7 and 8.

The annular division body 15 is retained by the spokes 9 of the breaker which are only accomodated in the outer annular division channel 17. Said spokes 9 divide a supplied stream of plastic into annular segment partial streams which annular segment partial streams will then be reunited with the plastic stream being supplied through the annular division channel 18.

It should be noted that the annular division channel 18 forms a free passage between the channel inlet 10 and the channel outlet 8 of the annular division channel 18.

It has appeared that a free passage of such a type is a prerequisite for the production of good pipes, especially for pipes having a small diameter.

The inlet 14 in front of the annualr division body 15, forms the end of a conically extending supply channel 11, said conical supply channel unites the plastic annular partial streams being obtained by means of the breaker plate 12, which is disposed upstream of the annular division body 15.

Preferably a conically extending supply channel 11 should be employed instead of a cylindrical supply channel 11, for the supply of plastic to the division channels 17 and 18, which bound the annular streams.

Another important aspect of the present invention is that in an extruder of this type for producing plastic pipes the wall of which comprises longitudinally extending hollow channels, longitudinal pin channels 21 are present which extend from the free end 19 of the pins into the annular division body 15, where the longitudinal pin channels debouch into an annular space 22. Said annular space 22 is connected through spoke channels 23 in the spokes 9 with passages 20, which debouch at the other end into ambient air, thus affording optimum results to be obtained. In this manner the presence of a subatmospheric pressure at that side of the pins where the two streams from the division channels 17 and 18 are reunited with one another, is prevented.

Preferably the conically extending supply channel 11 should be provided with walls 11a and 11b, which extend toward each other in the direction of the annular division body 15.

What is claimed is:

1. Method of manufacturing a plastic pipe, the wall of which comprises longitudinally extending hollow channels, by extruding a thermoplastic through an annular extrusion region, provided with a plurality of circumferentially equidistantly divided channel-forming pins, said pins being retained in an annular body disposed in a cylindrical channel, said pins forming longitudinal closed zones which form the hollow channels, whereby, prior to approaching said longitudinal closed zones, the stream of thermoplastic is subdivided into two concentric annular streams, the stream of thermoplastic being subdivided at at least one location into ring segment partial streams, only one of the concentric annular streams being subdivided into annular segment partial streams.

2. Method according to claim 1, wherein only the outermost concentric stream is divided into ring segment partial streams.

3. Method according to claim 1, wherein the stream of thermoplastic is subdivided into annular segment partial main streams, upstream of and at distance from the location at which the division into concentric annular streams takes place.

4. Apparatus for manufacturing a plastic tube the wall of which comprises longitudinally extending hollow channels, comprising an extruder provided with an extrusion nozzle, a plurality of circumferentially equidistantly divided channel forming pins, said pins being retained in an annular body disposed in a cylindrical channel, thereby dividing said channel into two concentric annular division channels, and at least one breaker, wherein at least one of the concentric annular division channels forms a free passage between the inlet and the outlet of the aforementioned annular division channel.

5. Apparatus for manufacturing a plastic pipe according to claim 4, wherein the innermost concentrically extending annular division channel forms the free passage.

6. Apparatus for manufacturing a plastic pipe according to claim 4, wherein a breaker retaining the annular body is disposed in the outermost channel of the concentric annular division channels.

7. Apparatus for manufacturing a plastic pipe according to claim 4, wherein upstream of the annular body another breaker is disposed.

8. Extrusion nozzle adapted to be used in an apparatus for manufacturing a plastic pipe, according to claim 4, said extrusion nozzle comprising a plurality of equidistantly circumferentially divided channel-shaped pins, said pins being retained in an annular body which is disposed in a cylindrical channel, while dividing this channel into two concentric annular division channels, and retaining means for retaining said annular body, wherein at least one of the concentric annular division channels forms a free passage between the channel inlet and the outlet of the aforementioned annular division channels.

* * * * *